US005587222A

United States Patent [19]
Hoffmann

[11] Patent Number: 5,587,222
[45] Date of Patent: Dec. 24, 1996

[54] LABEL ASSEMBLY WITH MULTI-PLY INSERT

[75] Inventor: Donald J. Hoffmann, Elmhurst, Ill.

[73] Assignee: Wallace Computer Services, Inc., Hillside, Ill.

[21] Appl. No.: 340,364

[22] Filed: Nov. 14, 1994

[51] Int. Cl.$^6$ .................................................. B32B 23/02
[52] U.S. Cl. .......................... 428/192; 428/42.1; 428/43; 428/177; 428/195; 428/198; 428/202; 428/203; 428/223; 428/343; 428/411.1; 428/914; 283/98; 283/100
[58] Field of Search ............................ 156/227; 428/40, 428/42, 43, 76, 174, 195, 411.1, 192, 198, 537.5, 914, 177, 192, 115, 121, 202, 203, 157, 223, 343; 283/98, 100

[56] References Cited

U.S. PATENT DOCUMENTS

| | | |
|---|---|---|
| 1,827,636 | 10/1931 | Ames . |
| 1,896,834 | 2/1933 | Brown . |
| 1,924,909 | 8/1933 | Brown . |
| 1,949,903 | 3/1934 | Falls . |
| 1,974,401 | 9/1934 | Miller . |
| 2,093,985 | 9/1937 | Stansbury . |
| 2,127,081 | 8/1938 | Brown . |
| 2,363,472 | 11/1944 | Ritter . |
| 2,614,349 | 10/1952 | Barnes . |
| 2,706,865 | 4/1955 | Miller . |
| 3,226,862 | 1/1966 | Gabruk . |
| 3,524,782 | 8/1970 | Buske . |
| 3,822,492 | 7/1974 | Crawley . |
| 3,926,113 | 12/1975 | Steidinger . |
| 4,104,816 | 8/1978 | Pingeton . |
| 4,323,608 | 4/1982 | Denny et al. . |
| 4,529,229 | 7/1985 | Glibbery . |
| 4,534,582 | 8/1985 | Howard . |
| 4,621,442 | 11/1986 | Mack . |
| 4,621,837 | 11/1986 | Mack . |
| 4,711,686 | 12/1987 | Instance . |
| 4,726,972 | 2/1988 | Instance . |
| 4,744,161 | 5/1988 | Instance . |
| 4,747,618 | 5/1988 | Instance . |
| 4,773,584 | 9/1988 | Instance . |
| 4,846,504 | 7/1989 | MacGregor et al. . |
| 4,850,613 | 7/1989 | Instance . |
| 4,944,979 | 7/1990 | Gagliano et al. . |
| 4,965,113 | 10/1990 | Jones et al. . |
| 5,127,676 | 7/1992 | Bockairo . |
| 5,234,735 | 8/1993 | Baker et al. . |
| 5,262,214 | 11/1993 | Instance . |
| 5,263,743 | 11/1993 | Jones . |
| 5,308,119 | 5/1994 | Roshkoff . |

*Primary Examiner*—William A. Krynski
*Attorney, Agent, or Firm*—Roylance, Abrams, Berdo & Goodman, L.L.P.

[57] ABSTRACT

A label assembly includes a label with a removable multi-ply insert attached thereto by at least one fastening strip. The label has an adhesive applied to one of its sides for attaching the label assembly to an article. In two embodiments, the label assembly has a pair of perforated fastening strips for removably coupling the multi-ply insert to the label, while the label remains attached to the article. In another embodiment, one edge of the top ply of the insert is secured to the label by a single fastening strip, while the other edge of the top ply of the insert extends outwardly from the remaining plies of the insert and is secured directly to the label. In yet another embodiment, a single large fastening strip overlies substantially the entire top ply of the insert, and extends outwardly from three of the peripheral edges of the insert to engage the label for peelably securing the insert to the label by a pressure-sensitive adhesive. These label assemblies are manufactured in a continuous, on-line manner to produce a large roll of label assemblies.

35 Claims, 9 Drawing Sheets

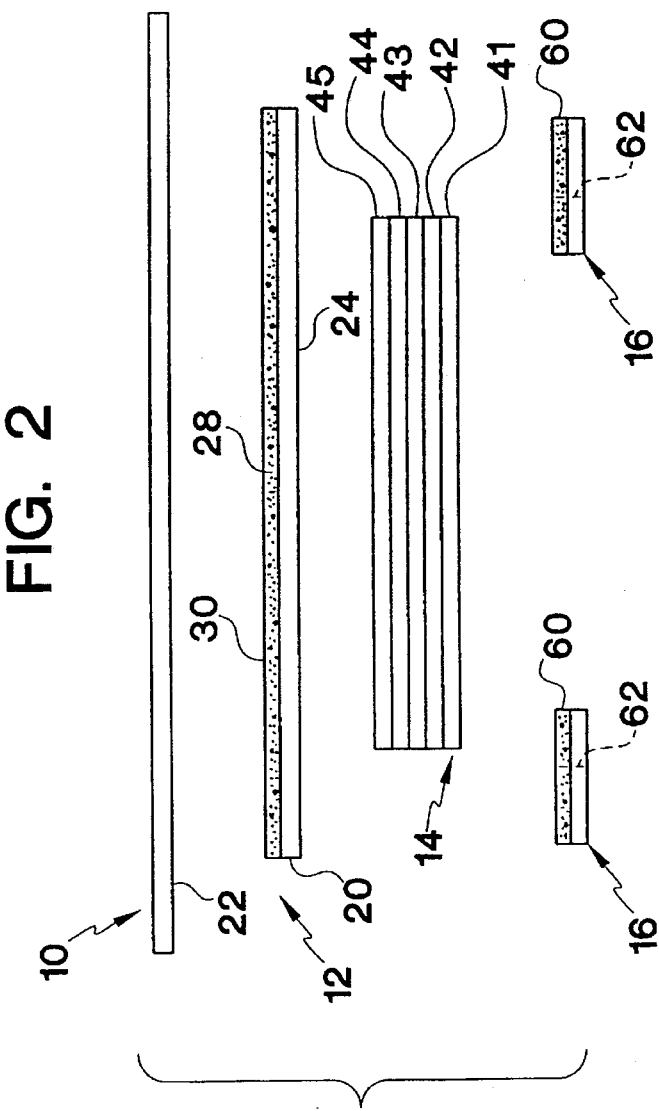

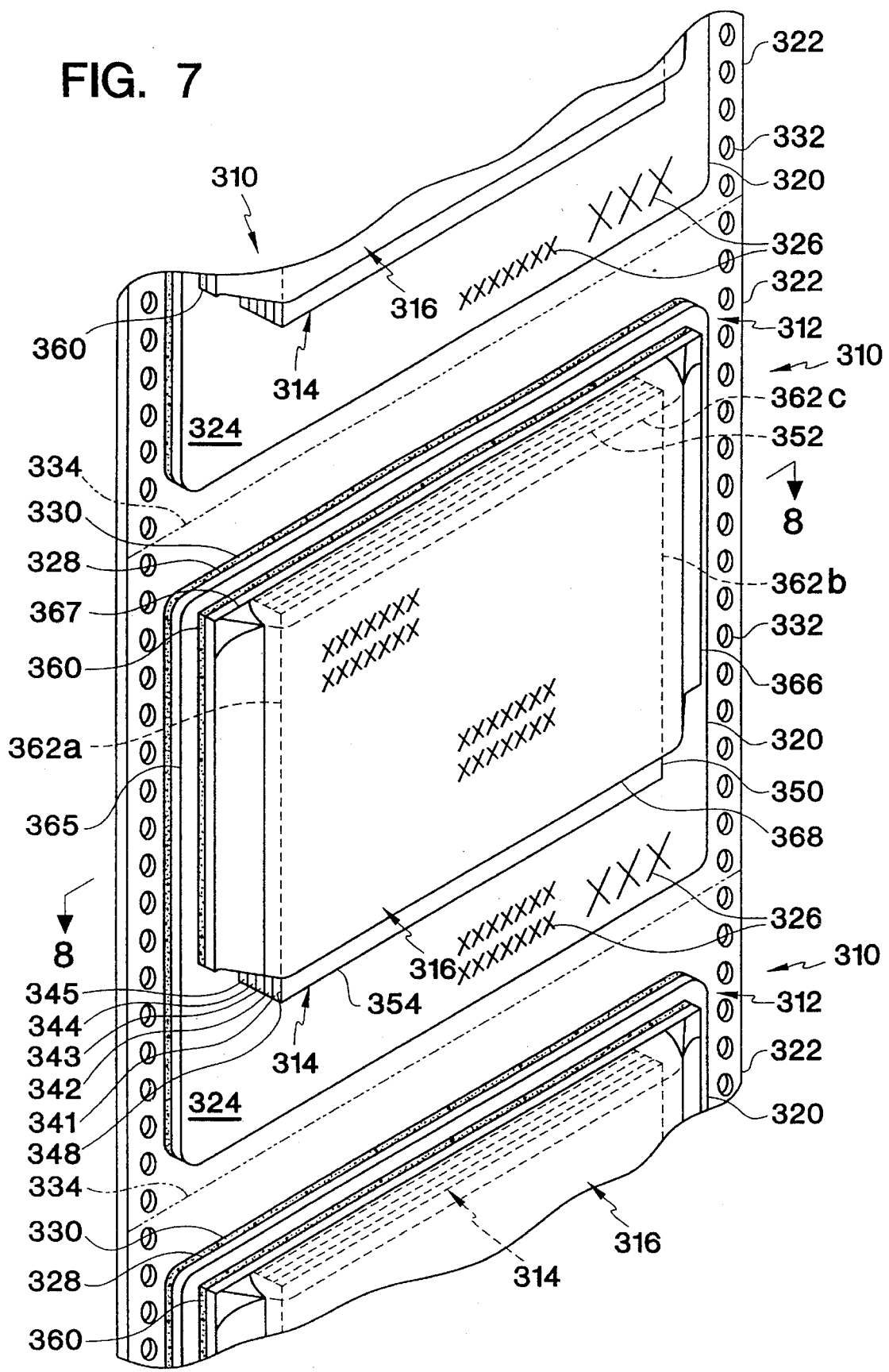

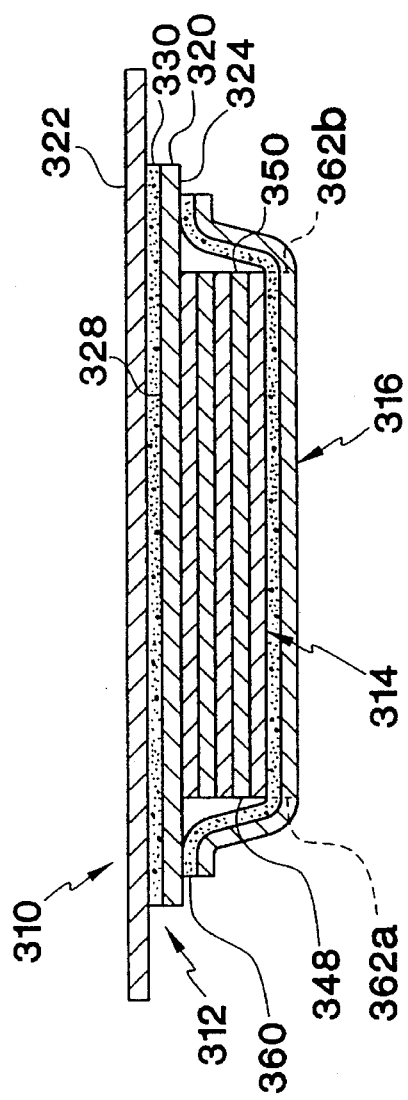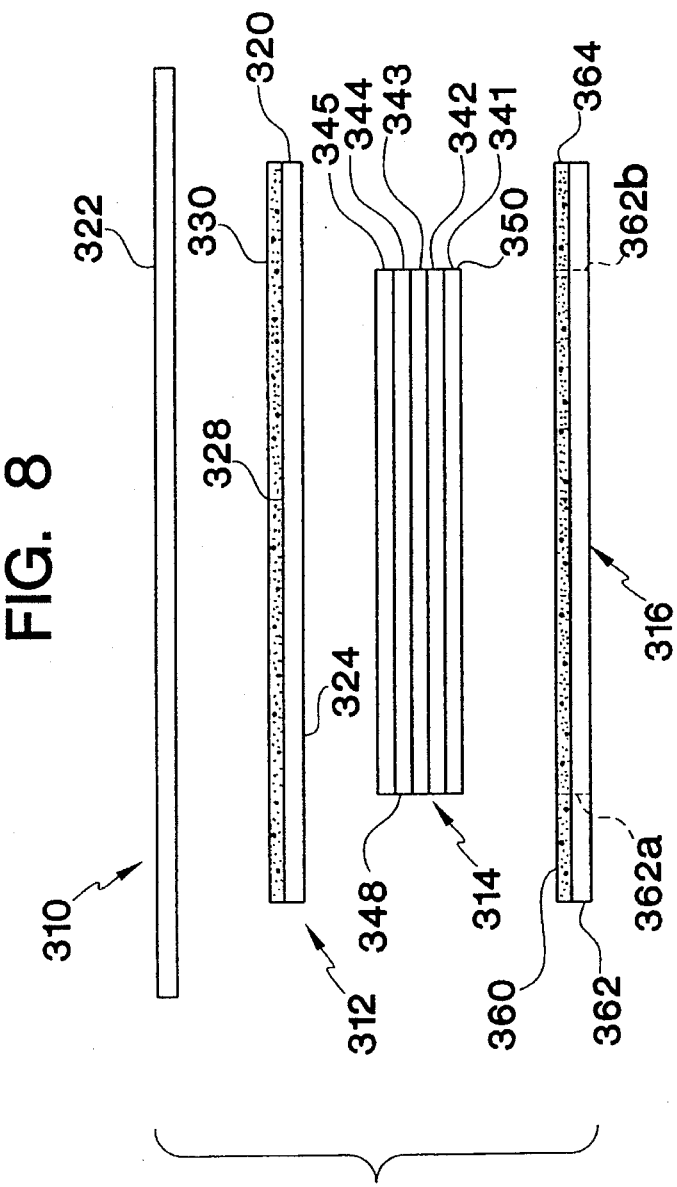

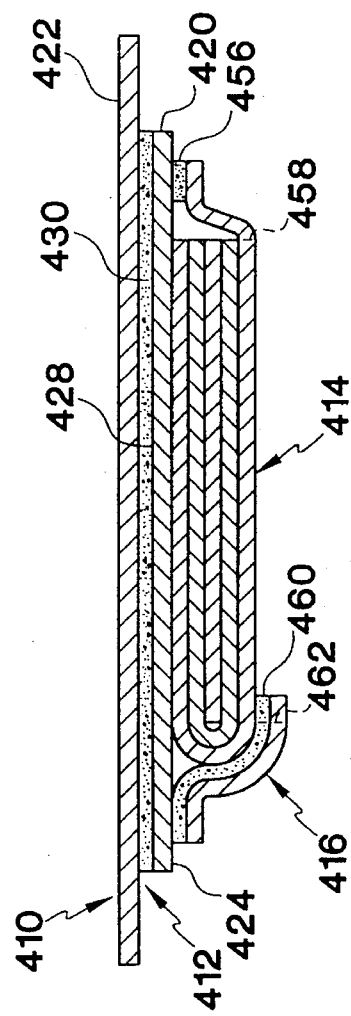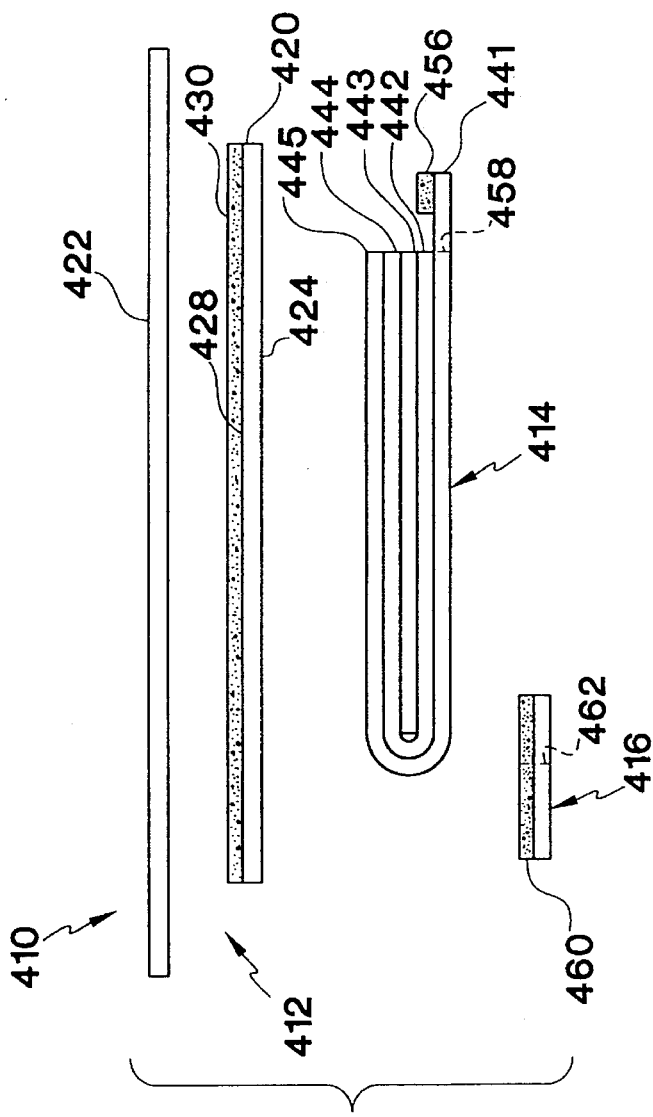
FIG. 11
FIG. 12

LABEL ASSEMBLY WITH MULTI-PLY INSERT

FIELD OF THE INVENTION

The present invention relates to labels which are attached to articles or products such as cans, bottles, boxes, packages, etc. More specifically, this invention relates to a label assembly with a multi-ply insert or informational materials removably coupled to a label by one or more fastening strips. The insert or informational materials may be a booklet, pamphlet, coupons or the like.

BACKGROUND OF THE INVENTION

It is often desired or needed to provide various products or articles with informational materials or an insert such as booklets, instructions, or coupons. A variety of methods exist for providing such informational materials with products. The oldest and most common method is merely placing the informational materials or insert in the packaging of products. However, this method is often cumbersome and impractical for certain types of products. Moreover, it is often desirable to have the informational materials or inserts attached to the exterior of the product so that it is readily available to the purchaser or user. For example, manufacturers of certain chemicals and pharmaceuticals are often required by government regulations to provide the user with a considerable amount of information concerning its chemical or pharmaceutical products.

Accordingly, many methods have been developed for attaching informational materials or inserts to the exterior of products. One method is to attach the informational materials to the product by an elastic string. However, this method is often cumbersome and difficult to employ in an inexpensive manner. A more recent approach has been to adhesively attach the informational materials to the exterior face of the product, either directly to the product itself, or to a base label which, in turn, is attached to the product. The informational materials or insert may then be removed by the purchaser from the product without opening its packaging.

Examples of some prior art which have addressed this problem are disclosed in U.S. Pat. Nos.: 1,827,636 to Ames; 1,896,634 to Brown; 1,924,909 to Brown; 1,949,903 to Fales; 1,974,401 to Miller; 2,093,985 to Stansbury; 2,127,081 to Brown; 2,363,472 to Ritter; 2,614,349 to Barnes; 3,226,862 to Gabruk; 3,524,782 to Buske; 3,822,492 to Crawley; 3,926,113 to Steidinger; 4,323,608 to Denny et al; 4,529,229 to Glibbery; 4,534,582 to Howard; 4,621,442 to Mack; 4,621,837 to Mack; 4,711,686 to Instance; 4,726,972 to Instance; 4,744,161 to Instance; 4,747,618 to Instance; 4,773,584 to Instance; 4,846,504 to MacGregor et al; 4,850,613 to Instance; 4,965,113 to Jones et al; 5,127,676 to Bockairo; 5,234,735 to Baker et al; 5,262,214 to Instance; 5,263,743 to Jones; and 5,308,119 to Roshkoff.

Many of these prior art label assemblies have numerous disadvantages. For example, many of the label assemblies are very complex and expensive to manufacture. In addition, some of the prior art label assemblies have informational materials which are difficult to remove from the product.

In view of the above, it is apparent that there exists a need for a label assembly which can be employed on almost any product, and which is easy and inexpensive to manufacture. This invention addresses these needs in the art, along with other needs which will become apparent to those skilled in the art once given this disclosure.

SUMMARY OF THE INVENTION

Accordingly, an object of the present invention is to provide a label assembly with a base ply or label permanently secured to the product and an insert removably secured to the base ply or label.

Another object of the present invention is to provide a label assembly which is relatively easy and inexpensive to manufacture.

These objects and other objects are basically attained by providing a label assembly for attaching to a product, comprising: a base ply having an informational side and an adhesive side with an adhesive thereon for attaching to the product; a multi-ply insert overlying a portion of the informational side of the base ply, the insert having a top ply with a peripheral edge; and a pair of separately spaced fastening strips with an adhesive on one side for permanently securing the fastening strips to the informational side of the base ply and to said top ply along its peripheral edge; each of the fastening strips having a line of weakness extending substantially adjacent said peripheral edge of the top ply.

The foregoing objects can also be attained by a label assembly for attaching to a product, comprising: a base ply having an informational side and an adhesive side with an adhesive thereon for attaching to the product; a multi-ply insert overlying a portion of the informational side of the base ply, the insert having a top ply with a rectangular peripheral edge; and a fastening strip having a rectangular peripheral edge and an adhesive on one side extending along at least a portion of the peripheral edge of the fastening strip for securing the fastening strip to the informational side of the base ply. The fastening strip overlies the insert such that three sides of the peripheral edge of the fastening strip extend outwardly beyond three sides of the peripheral edge of the insert to engage the base ply, while a fourth side of the peripheral edge of the fastening strip remaining free from engagement with the base ply along the insert to allow removal of the insert from the base ply.

Also, the foregoing objects can be attained by a label assembly for attaching to a product, comprising: a base ply having an informational side and an adhesive side with an adhesive thereon for attaching to the product; a multi-ply insert overlying a portion of the informational side of the base ply; and a fastening strip. The insert has a top ply with exterior and interior surfaces extending between its peripheral edge and an adhesive portion on the interior surface of the top ply along a first portion of the peripheral edge for engaging the base ply to secure the insert to the base ply along the first portion. The fastening strip is separate from the insert and has an adhesive on one side securing it to the base ply and to the exterior surface of the top ply along a second portion of the peripheral edge of the insert which is separated and spaced from the first portion of the insert.

The objects can further be attained by the method of manufacturing a label assembly for affixing to a product, comprising the steps of: applying an adhesive to a first side of a base ply to form a label, placing a multi-ply insert with at least a bottom ply and a top ply onto a second side of the base ply; and applying at least one fastening strip with an adhesive thereon so that the adhesive of the fastening strip engages the second side of the base ply and the top ply of the insert; the at least one fastening strip being applied to the insert to only partially cover the insert.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form part of this original disclosure:

FIG. 2 illustrates a top cross-sectional view of the label assembly of FIG. 1 taken along section line 2—2;

FIG. 3 illustrates an exploded, top plan view of the label assembly of FIGS. 1 and 2;

FIG. 7 illustrates a partial perspective view of a third embodiment of a label assembly in accordance with the present invention;

FIG. 8 illustrates a top cross-sectional view of the label assembly of FIG. 7 taken along section line 8—8;

FIG. 9 illustrates an exploded, top plan view of the label assembly of FIGS. 7 and 8;

FIG. 11 illustrates a top cross-sectional view of the label assembly of FIG. 10 taken along section line 11—11;

FIG. 12 illustrates an exploded, top plan view of the label assembly of FIGS. 10 and 11.

DETAILED DESCRIPTION OF THE PREFERRED EMBODIMENTS

Figure 1:
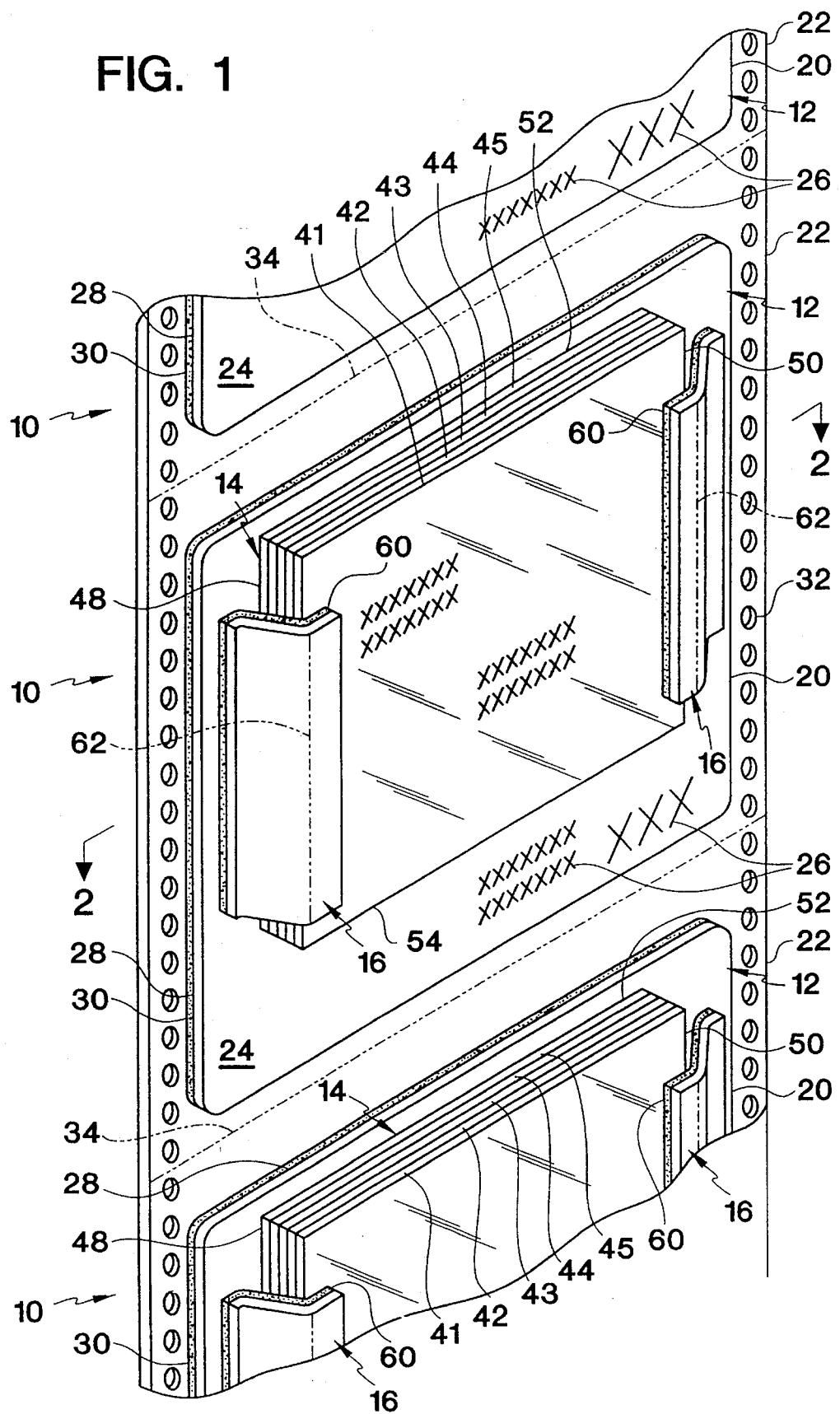
FIG. 1 illustrates a partial perspective view of a first embodiment of a label assembly in accordance with the present invention.

Referring initially to FIGS. 1–3, a label assembly 10 in accordance with a first embodiment of the present invention is illustrated which is adapted to be adhesively coupled to an article or product (not shown). Label assembly 10 includes a label stock 12 for attaching to a product, a multi-ply insert 14 of informational materials attached to and overlying label stock 12, and a pair of fastening strips 16 for permanently coupling multi-ply insert 14 to label stock 12.

The layers of sheet materials used in construction of label assembly 10 are produced with a standard thickness from conventional materials used in the label manufacturing field. Thus, the construction of the sheet materials for label assembly 10 will not be discussed in detail herein. Moreover, the sheet materials, which are used for the layers of label assembly 10, are exaggerated in thickness for purposes of illustration in the figures. In any event, a suitable thickness for the layers can be, for example, about one mil. thick to about four mil. thick.

Label stock 12 includes a preprinted, die cut, pressure-sensitive base ply or layer 20 and a release liner or carrier sheet 22. Preferably, base ply 20 is in the form of a label having an informational side 24 with indicia 26 preprinted thereon, and an adhesive side 28 with a layer of adhesive 30 thereon. Informational side 24 can also include a space for receiving variable information which can be applied by a suitable writing tool such as a pen, pencil, typewriter or computer-controlled printing apparatus as desired or necessary. For example, indicia 26 on informational side 24 can be variable imaged data, i.e., different information for each label assembly 10, and/or pre-imaged data which is printed thereon. Indicia 26 can be printed on base ply 20 either before base ply 20 is collated with the plies of insert 14, or during collation of the plies of insert 14 with the base ply 20. Alternatively, informational side 24 can be completely absent of indicia, if desired.

Adhesive 30 is preferably a pressure-sensitive adhesive which is conventional and commonly used in the label manufacturing field. Of course, other types of adhesives may be utilized as needed or desired. Depending on the intended use of label assembly 10 and the type adhesive used on base ply 20, release liner 22 can be eliminated. Although use of release liner 22 in conjunction with a pressure-sensitive adhesive is preferred.

Release liner 22 is preferably a continuous web or carrier sheet with a plurality of control openings 32 positioned longitudinally along the margins of release liner 22 to facilitate manufacturing and processing of label assemblies 10. Base ply 20 is releasably secured to release liner 22 by adhesive 30. Release liner 22 has a plurality of transverse lines of weakness 34 for separating release liner 22 into a plurality of rectangular sheets of release liners with each sheet being associated with one of the label assemblies 10. Accordingly, a continuous roll of label assemblies 10 can be formed on a roll of release liner 22 with the label assemblies 10 being separable from each other by perforations 34. Release liner 22 is preferably made of a standard silicone release material or wax material typically used in the label manufacturing field.

Multi-ply insert 14 includes a plurality of sheets or plies 41–45. Plies 41–45 have indicia printed thereon, which can be variable imaged data and/or pre-imaged data. Thus, plies 41–45 for each of the label assemblies 10 can be either identical, partially identical or completely different. For example, label assemblies 10 can be personalized to members of a group, to specific individual, to a type of individual, by geographical region, etc. Also, one or more of plies 41–45 can be in the form of a pressure-sensitive label with a release liner. For example, layer 44 can be a release liner and layer 43 can be a label with a pressure-sensitive coating on its surface facing layer or release liner 44. While five sheets or plies are illustrated as comprising insert 14, it will be apparent to those skilled in the art that fewer or more plies can be used in constructing multi-ply insert 14.

Preferably, plies 41–45 are secured together along one portion of their peripheral edge in a conventional manner. For example, plies 41–45 can be glued or adhesively coupled together along one portion of their peripheral edge as shown in FIGS. 1 and 2, or they could be fastened together by a fastener such as a staple (not shown). Of course, plies 41–45 can be constructed of one or more sheets of material plowed together or separately along one edge and then fastened to base ply 20 by fastening strips 16. Thus, plies 41–45 can form a booklet, if desired.

As seen in FIG. 1, each of the plies 41–45 has a first pair of parallel, vertical edges 48 and 50, and a second pair of parallel, horizontal edges 52 and 54 which together with edges 48 and 50 forms a substantially rectangular peripheral edge. While vertical edges 48 of plies 41–45 are illustrated as being coupled together, it will be apparent to those skilled in the art from this disclosure that the plies 41–45 can be coupled together or folded along any one or more of its edges as needed and/or desired. Preferably, plies 41–45 are all the same size and are smaller than base ply 20. While plies 41–45 are illustrated as being rectangular, it will be apparent to those skilled in the art from this disclosure that insert 14 can have a variety of shapes as needed or desired.

Moreover, some or all of the plies 41–45 can have one or more lines of weakening or perforations (not shown) for separating the plies from each other as well as separating a ply into various portions.

Top ply 41 can be constructed of a transparent sheet material with a pressure-sensitive adhesive on its side facing the other plies for securing top ply 41 to the second ply 42. In this manner, top ply 41 protects the remaining plies 42–45 by overlying the outer facing surface of ply 42.

Bottom ply 45 together with plies 41–44 are preferably tipped onto informational side 24 of base ply 20. Optionally, insert 14 can be releasably secured to label stock 12 by a peelable, pressure-sensitive adhesive (not shown) positioned between informational side 24 of base ply 20 and bottom ply 45. Preferably, a peelable, pressure-sensitive adhesive is only applied to a small portion of the side of bottom ply 45 which faces informational side 24 of base ply 20 so that insert 14 can be easily removed.

Fastening strips 16 are preferably thin strips with a permanent, pressure-sensitive adhesive 60 applied to one of its sides for being permanently secured to informational side 24 of base ply 20 and to top ply 41 of insert 14. Each of the fastening strips 16 is provided with a line of weakness such as perforations 62 for removing insert 14 from base ply 20. In other words, insert 14 is removed from base ply 20 by grasping one of the free edges of insert 14 and pulling the insert 14 so as to tear fastening strips 16 along perforations 62. Fastening strips 16 can be constructed of any suitable thin flexible material and can be either transparent or opaque.

Fastening strips 16 are preferably shorter in length than the edges of insert 14 which they are attached to so that one of the free edges of insert 14 can be easily grasped. Of course, similar to other embodiments discussed below, the fastening strips 16 can be equal to or greater than the length of the vertical edges 48 and 50 of insert 14.

To use label assembly 10, release liner 22 is peeled away from adhesive side 28 of base ply 20 so that base ply 20 can be attached directly to a product. Insert 14 is indirectly applied to the container since insert 14 is secured to base ply 20 via fastening strips 16. Once label assembly 10 without release liner 22 is attached to a product, the ultimate user or consumer of the product can remove the insert 14 from the product and base ply 20 by grasping the insert along either its horizontal edges 52 or 54, and then pulling insert in a direction parallel to perforations 62. This will cause fastening strips 16 to easily tear along perforations 62 to allow removal of insert 14 from base ply 20 and the product. Accordingly, a first portion of fastening strips 16 remains fastened to base ply 20 by adhesive 60 and a second portion of fastening strips 16 remains fastened to top ply 41 of insert 14 via adhesive 60.

Label Assembly 210

Figure 4:
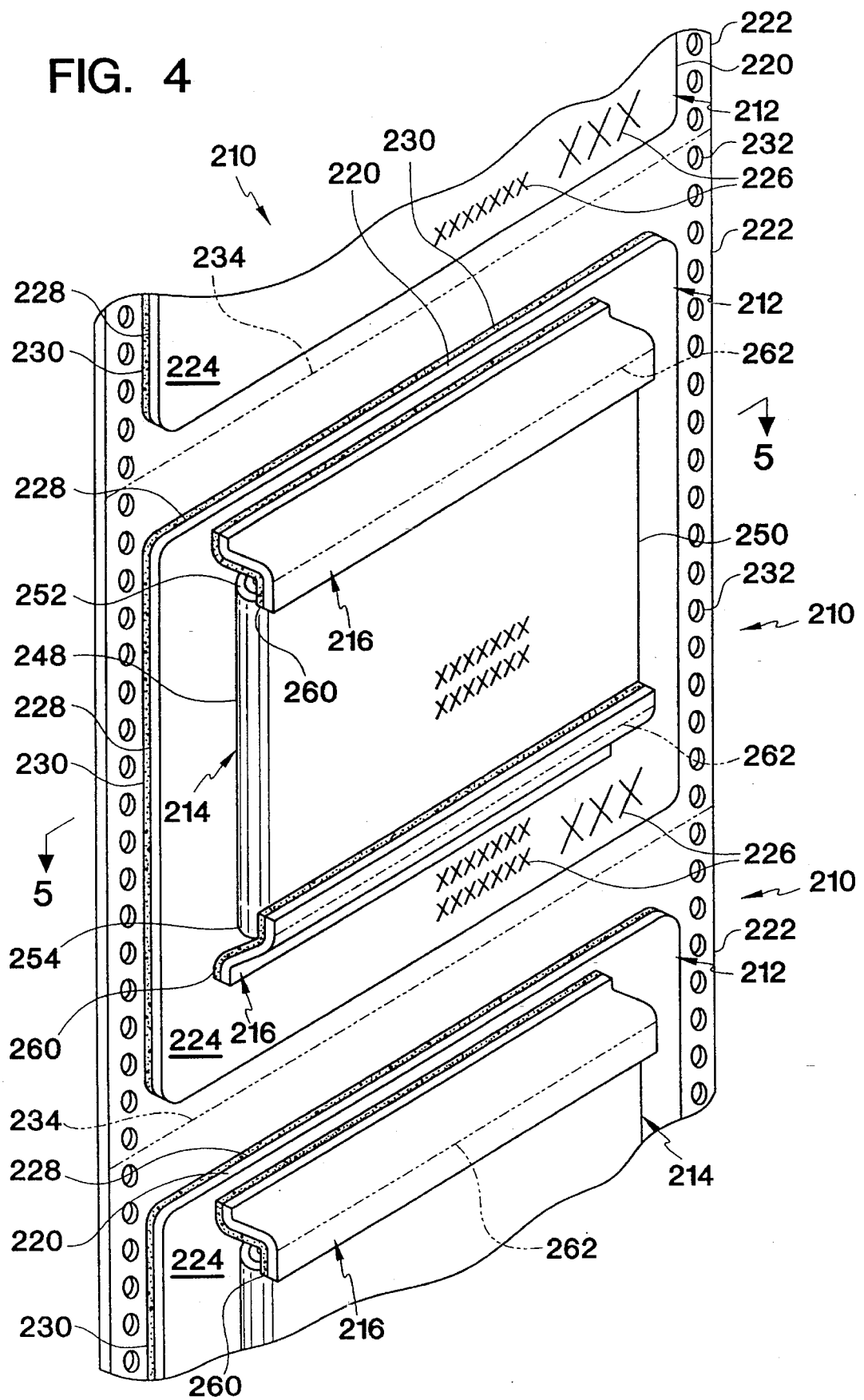
FIG. 4 illustrates a partial perspective view of a second embodiment of a label assembly in accordance with the present invention.
Figure 5:
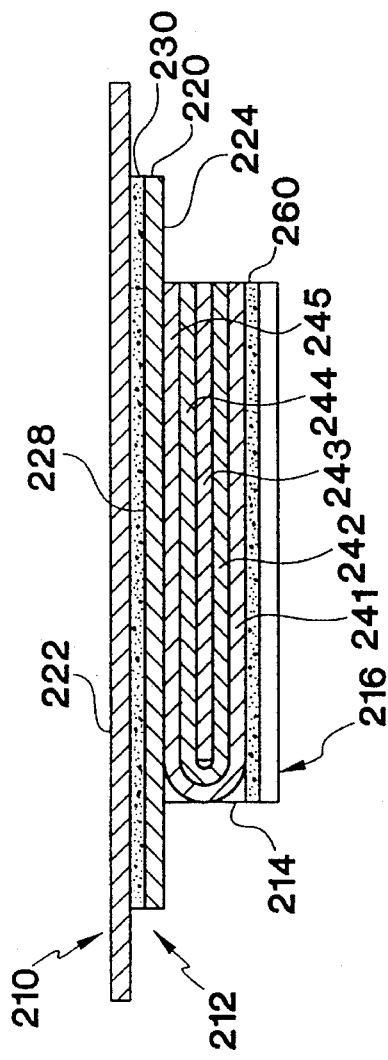
FIG. 5 illustrates a top cross-sectional view of the label assembly of FIG. 4 taken along section line 5—5.
Figure 6:
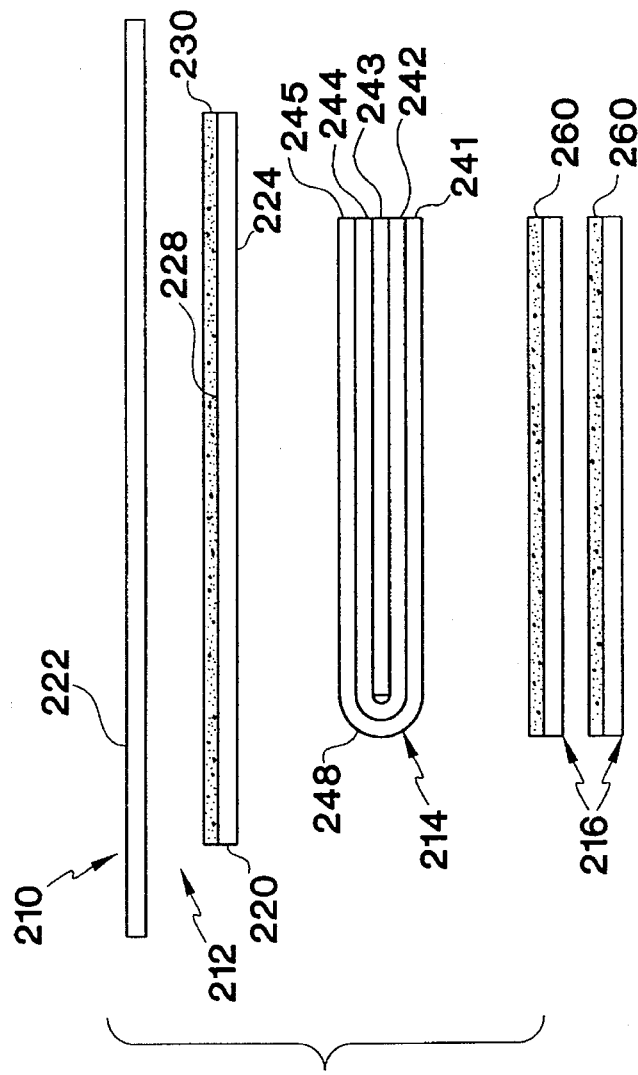
FIG. 6 illustrates an exploded, top plan view of the label assembly of FIGS. 4 and 5.

As seen in FIGS. 4–6, a label assembly 210 in accordance with a second embodiment of the present invention is illustrated for adhesively coupling to an article or product. Label assembly 210 is a modified version of the label assembly 10 discussed above, and thus will not be discussed in as much detail herein. Label assembly 210 includes a label stock 212 for attaching to a product, a multi-ply insert 214 of informational materials attached to and overlying label stock 212, and a pair of fastening strips 216 for permanently coupling multi-ply insert 214 to label stock 212. Similar to the first embodiment, the thicknesses of the layers of label assembly 210 have been exaggerated for purposes of illustration in the figures.

Label stock 212 includes a preprinted, die cut, pressure-sensitive base ply or layer 220 and a release liner or carrier sheet 222. Preferably base ply 220 is in the form of a label having an informational side 224 with indicia 226 preprinted thereon, and an adhesive side 228 with a layer of adhesive 230 thereon. Informational side 224 can also include a space for receiving variable information which can be applied by a suitable writing tool such as a pen, pencil, typewriter or computer-controlled printing apparatus as desired or necessary. For example, indicia 226 on informational side 224 can be variable imaged data, i.e., different information for each label assembly 210, and/or pre-imaged data which is printed thereon. Indicia 226 can be printed on base ply 220 either before base ply 220 is collated with the plies of insert 214, or during collation of the plies of insert 214 with the base ply 220. Alternatively, informational side 224 can be completely absent of indicia, if desired.

Adhesive 230 is preferably a pressure-sensitive adhesive which is conventional and commonly used in the label manufacturing field. Of course, other types of adhesives may be utilized as needed or desired. Depending on the intended use of label assembly 210 and the type adhesive used on base ply 220, release liner 222 can be eliminated. Although, use of release liner 222 in conjunction with a pressure-sensitive adhesive is preferred.

Release liner 222 is preferably a continuous web or carrier sheet with a plurality control openings 232 positioned longitudinally along the margins of release liner 222 to facilitate manufacturing and processing of label assemblies 210. Base ply 220 is releasably secured to release liner 222 by adhesive 230. Accordingly, a continuous roll of label assemblies 210 can be formed on a roll of release liner 222 with the label assemblies 210 being separable from each other by perforations 234. Release liner 222 is preferably made of a standard silicone release material or wax material typically used in the label manufacturing field.

Multi-ply insert 214 includes a plurality of sheets or plies 241–245. Plies 241–245 have indicia printed thereon, which can be variable imaged data and/or pre-imaged data. Thus, plies 241–245 for each of the label assemblies 210 can be either identical, partially identical or completely different. For example, label assemblies 210 can be personalized to members of a group, to specific individual, to a type of individual, by geographical region, etc. Also, one or more of plies 241–245 can be in the form of a pressure-sensitive label with a release liner. For example, layer 244 can be a release liner and layer 243 can be a label with a pressure-sensitive coating on its surface which faces layer or release liner 244. While five sheets or plies are illustrated as comprising insert 214, it will be apparent to those skilled in the art that fewer or more plies can be used in constructing multi-ply insert 214. In this embodiment, insert 214 has two sheets folded in half to create plies 241, 242, 244 and 245, and a center ply 243 position between the folded sheet creating plies 242 and 244.

As seen in FIG. 4, each of the plies 241–245 has a first pair of vertical edges 248 and 250, and a second pair of horizontal edges 252 and 254. Plies 241–245 can be secured together along one portion of their peripheral edge in a conventional manner, if desired or needed. For example, plies 241–245 can be glued or adhesively coupled together along one portion of their peripheral edge as shown in FIGS. 4 and 6 or they could be fastened together by a fastener such as a staple (not shown).

While vertical edges 242 of plies 241, 242, 244 and 245 are folded together, it will be apparent to those skilled in the art from this disclosure that the plies 241–245 can be coupled together or folded along any one or more of its edges as needed and/or desired. Moreover, plies 241–245 can be individual plies, which are coupled together along one edge. Preferably, plies 241–245 are all the same size and are smaller than base ply 220. While plies 241–245 are illustrated as being rectangular, it will be apparent to those skilled in the art from this disclosure that insert 214 can have a variety of shapes as needed or desired.

Moreover, some or all of the plies 241–245 can have one or more lines of weakness or perforations (not shown) for separating the plies from each other as well as separating a ply into various portions.

Bottom ply 245 is preferably tipped onto informational side 224 of base ply 220. In other words, insert 214 can be releasably secured to label stock 212 by a peelable, pressure-sensitive adhesive (not shown) positioned between informational side 224 of base ply 220 and bottom ply 245. Preferably, the peelable, pressure-sensitive adhesive is only applied to a small portion of the side of bottom ply 245 which faces informational side 224 of base ply 220 so that insert 214 can be easily removed.

Fastening strips 216 in this embodiment are preferably thin strips with a permanent, pressure sensitive adhesive 260 applied to one of its sides for being permanently secured to information side 224 of base ply 220 and top ply 241 of insert 214. Each of the fastening strips 216 is provided with a line of weakness such as perforations 262 for removing insert 214 from base ply 220. In other words, insert 214 is removed from base ply 220 by grasping one of the free edges of insert 214 and pulling the insert 214 so as to tear fastening strips 216 along perforations 262. Fastening strips 216 can be constructed of any suitable thin material. Fastening strips 216 can also be either transparent or opaque.

Fastening strips 216 in this embodiment are preferably the same length as horizontal edges 252 and 254 of insert 214. Of course, the fastening strip 216 can be shorter or greater than the length of the horizontal edges 252 and 254 of the insert 214, as used and/or desired.

Label Assembly 310

Referring now to FIGS. 7–9, a label assembly 310 in accordance with a third embodiment of the present invention is illustrated which is adapted to be adhesively coupled to an article or product (not shown). Label assembly 310 includes a label stock 312 for attaching to a product, a multi-ply insert 314 of informational materials attached to and overlying the outer surface of label stock 312, and a fastening strip 316 for removably coupling multi-ply insert 314 to label stock 312. The thickness of the layers of label assembly 310 have been exaggerated for purposes of illustration on in the figures.

Label stock 312 includes a preprinted die-cut, pressure-sensitive base ply or layer 320 and a release liner or carrier sheet 322. Preferably, base ply 320 is in the form of a label having an informational side 324 with indicia 326 printed thereon, and an adhesive side 328 with a layer of adhesive 330 thereon. Informational side 324 can also include a space for receiving variable information which can be applied by a suitable writing tool such as a pen, pencil, typewriter or computer controlled printing apparatus as desired or necessary. For example, indicia 326 on information side 324 can be variable imaged data, i.e., different information for each label assembly 310, and/or pre-imaged data which is printed thereon. Indicia 326 can be printed on base ply 320 either before base ply 320 is collated with the plies of insert 314, or during collation of the plies of insert 314 with the base ply 320. Alternatively, informational side 324 can be completely absent of indicia, if desired.

Adhesive 330 is preferably a conventional pressure-sensitive adhesive which is conventional and commonly used in the label manufacturing field. Of course, other types of adhesives may be utilized as needed or desired. Depending on the intended use of label assembly 310 and the type adhesive used on base ply 320, release liner 322 can be eliminated. Although use of release liner 322 in conjunction with a pressure-sensitive adhesive is preferred.

Release liner 322 is preferably a continuous web or carrier sheet with a plurality of control openings 332 positioned longitudinally along the margins of release liner 322 to facilitate manufacturing and processing of label assemblies 310. Base ply 320 is releasably secured to release liner 322 by adhesive 330. Release liner 322 has a plurality of transverse lines of weakening 334 for separating release liner 322 into a plurality of rectangular sheets of release liners with each sheet being associated with one of the label assemblies 310. Accordingly, a continuous roll of label assemblies 310 can be manufactured with the label assemblies 310 being separated from each other by perforations 334. Release liner 322 is preferably made of a standard silicone release material or wax material typically used in the label manufacturing field.

Multi-ply insert 314 includes a plurality of sheets or plies 341–345. Plies 341–345 have indicia printed thereon, which can be variable imaged data and/or pre-imaged data. Thus, plies 341–345 for each of the label assemblies 310 can be either identical, partially identical or completely different. For example, label assemblies 310 can be personalized to members of a group, to specific individual, to a type of individual, by geographical region, etc. Also, one or more of plies 341–345 can be in the form of a pressure-sensitive label with a release liner. For example, layer 344 can be a release liner and layer 343 can be a label with a pressure-sensitive coating on its surface which faces layer or release liner 344. The data printed on plies 341–345 can be applied either during or before collation of label assembly 310. While five sheets or plies are illustrated as comprising insert 314, it will be apparent to those skilled in the art that fewer or more plies can be used in constructing multi-ply insert 314.

Preferably, plies 341–345 are held to the base ply 314 by a single fastening strip 316. Preferably, plies 341–345 are secured together in a conventional manner along one of the peripheral edges. For example, plies 341–345 can be glued or adhesively coupled together along one portion of their peripheral edge, or they can be fastened together by a conventional fastener such as a staple. Of course, plies 341–345 can be constructed of one or more sheets of material plowed together or separately along one edge and then fastened to base ply 320 by fastening strip 316. Thus, plies 341–345 can form a booklet, if desired.

Preferably, plies 341–345 are rectangular and each have an outer peripheral edge with a first pair of vertical edges 348 and 350, and a second pair of horizontal edges 352 and 354. Fastening strip 316 preferably completely covers the entire insert 314, except for a portion along lower edges 354 of plies 341–345 so that the insert 314 is sandwiched base ply 320 and fastening strip 316.

Fastening strip 316 is preferably a thin rectangular strip of sheet material having a pair of parallel vertical edges 365 and 366, and a pair of parallel horizontal edges 367 and 368 with a pressure-sensitive adhesive 360 applied to one of its sides for securing insert 314 to base ply 320. Fastening strip 316 is preferably permanently secured to base ply 320 by adhesive 360 and releasably secured to multi-ply insert 314. Specifically, fastening strip 316 has three sets of perforations or lines of weakness 362*a*, 362*b* and 362*c* for permitting removal of multi-ply insert 314 from base ply 320. Preferably, perforations 362*a* and 362*b* are parallel to and/or aligned with vertical edges 348 and 350 of insert 314, respectively. Perforations 362*c* are preferably parallel to and/or aligned with horizontal edges 352 of multi-ply insert 314.

Fastening strip 316 is slightly larger in size than insert 314 so that three edges of fastening strip 316 extend outwardly from insert 314 for securing fastening strip 316 to base ply 320 by adhesive 360. In other words, adhesive 360 on fastening strip 316 engages base ply 320 along three of its four edges, i.e., edges 365, 366 and 367. However, peripheral edge 368 of fastening strip 316 is preferably either coextensive with peripheral edge 354 of insert 314 or spaced inwardly from peripheral edge 354 of insert 314 as seen in FIG. 7 so that a convenient access area is provided between fastening strip 316 and base ply 320 for accessing insert 314. In other words, a user can easily insert a finger in between fastening strip 316 and base ply 320 for removing insert 314 as well as fastening strip 316 from base ply 320.

Adhesive 360 of fastening strip 316 is preferably a permanent pressure-sensitive adhesive where it contacts base ply 320, but a peelable pressure-sensitive adhesive where it contacts insert 314. Accordingly, removal of insert 314 will not tear or otherwise damage base ply 320 or top ply 341 when fastening strip 316 tears along perforations 362*a*–362*c* and then is removed from top ply 341. Of course, adhesive 360 of fastening strip 316 can be a permanent adhesive which is permanently secured to both base ply 320 and top ply 341 of insert 341 such that when insert 314 is removed from base ply 320 via perforations 362*a*–362*c*, a first portion of the fastening strip 316 remains permanently secured to base ply 320 and a second portion of the fastening strip 316 remains permanently secured to top ply 341 of insert 314.

Alternatively, another embodiment of label assembly 310 could be to eliminate perforations 362*a*–362*c* and use a peelable adhesive for securing fastening strip 316 to base ply 320 and top ply 341 of insert 314. Accordingly, in this alternative embodiment, fastening strip 316 can be removed from base ply 320 and insert 314 without tearing or otherwise damaging them. This alternative embodiment has the advantage that none of the fastening strip 316 is left on base ply 320. Moreover, adhesive 360 can be applied over selected areas of one side of fastening strip 316 so that insert 314 is adhesively secured to fastening strip 316, but peelably releasable therefrom.

Label Assembly 410

Figure 10:
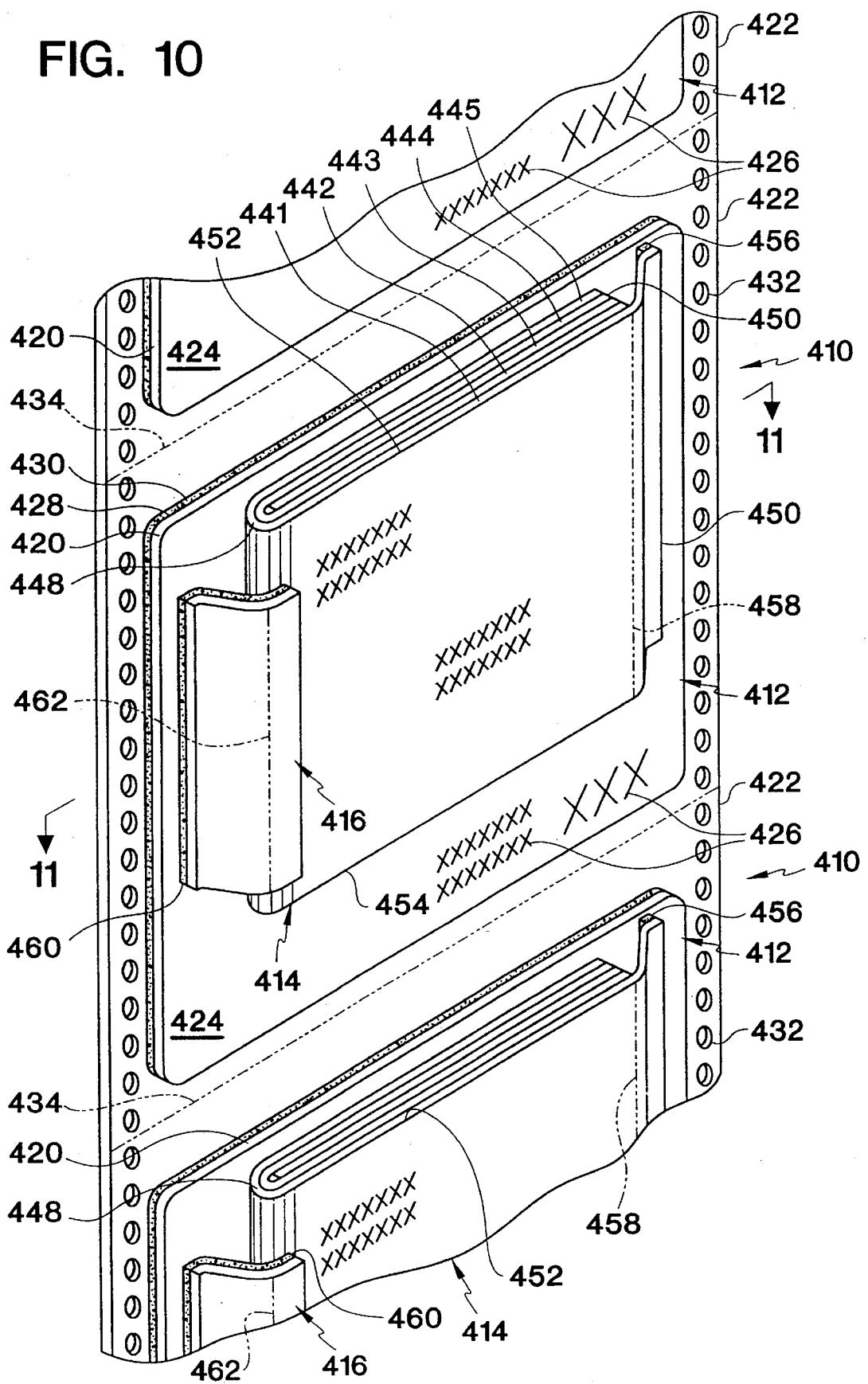
FIG. 10 illustrates a partial perspective view of a fourth embodiment of a label assembly in accordance with the present invention.

As seen in FIGS. 10–12, a label assembly 410 in accordance with a fourth embodiment of the present invention is illustrated. Label assembly 410 is a further modified version of the previous label assemblies. Label assembly 410 includes a label stock 412 for attaching to a product (not shown), a multi-ply insert 414 of informational materials attached to and overlying label stock 412, and a fastening strip 416 for coupling an edge of multi-ply insert 414 to label stock 412. The layers of sheet materials used in construction of label assembly 410 are produced with a standard thickness and from conventional materials used in the label manufacturing field. Moreover, the layers of label assembly 40 are exaggerated in thickness for purposes of illustration in the figures.

Label stock 412 includes a preprinted, die cut, pressure-sensitive base ply or layer 420 and a release liner or carrying sheet 422 overlying one side of base ply 420. Base ply 420 has an informational side 424 with indicia 426 printed thereon, and an adhesive side 428 with a layer of adhesive 430 thereon. For example, indicia 426 on informational side 424 can be variable imaged data, i.e., different information for each label assembly 410, and/or pre-imaged data which is printed thereon. Indicia 426 can be printed on base ply 420 either before base ply 420 is collated with the plies of insert 414, or during collation of the plies of insert 414 with the base ply 420. Informational side 424 also can include a space for receiving variable information which can be applied by a suitable writing tool such as a pen, pencil, typewriter or computer-controlled printing apparatus as desired or necessary.

Adhesive 430 is preferably a pressure-sensitive adhesive which is conventionally and commonly used in the label manufacturing field. Of course, other types of suitable adhesives can be utilized.

Release liner 422 is preferably a continuous web or carrier sheet with a plurality of control openings 432 positioned longitudinally along the margins of release liner 422 to facilitate manufacturing and processing of the label assemblies 410. Release liner 422 has a plurality of transverse lines of weakening or perforations 434 for separating release liner 422 into a plurality of rectangular sheets of release liners, with each sheet being associated with one of the label assemblies 410. Accordingly, a continuous roll of label assemblies 410 can be manufactured such that each of the label assemblies 410 are separable from each other by perforation 434.

Multi-ply insert 414 can be formed of a plurality of sheets or plies 441–445 which are secured together along a portion of their peripheral edges in a conventional manner. For example, plies 441–445 can be a plurality of sheets which are folded along one of their peripheral edges. The plies can then be fastened together if desired or need. In this embodiment, insert 414 has two sheets folded in half to create plies 441, 442, 444 and 445, and a center ply 443 positioned between the fold sheet creating plies 442 and 444. Of course, insert 414 can be constructed of individual non-folded plies, or plies plowed together or separately along one edge.

Plies 441–445 have indicia printed thereon, which can be variable imaged data and/or pre-imaged data. Thus, plies 441–445 for each of the label assemblies 410 can be either identical, partially identical or completely different. For example, label assemblies 10 can be personalized to members of a group, to specific individual, to a type of individual, by geographical region, etc. Also, one or more of plies 441–445 can be a release liner and layer 443 can be a label with a pressure-sensitive coating on its surface which faces layer or release liner 444.

As seen in FIG. 10, each of the plies 441–445 of insert 414 has a pair of parallel vertical edges 448 and 450, and a second pair of parallel horizontal edges 452 and 454. Preferably, edges 448, 452 and 454 of each of the plies 441–445 are coextensive with each other, while vertical edge 450 of top ply 441 is spaced outwardly from the vertical edges 450 of the remaining plies which are coextensive with each other and spaced inwardly from vertical edge 450 of top ply 441.

Top ply 441 has an adhesive strip 456 applied to its interior surface along its vertical edge 450. Accordingly, top ply 441 of insert 414 is fixedly coupled to base ply 420 by adhesive strip 456. Top ply 441 also includes a line of weakness or perforations 458 for separating the portion of top ply 441 along edge 450 from the remaining portion of top ply 441. Preferably, perforations 458 are coextensive with edges 450 of plies 442–445.

Fastening strip 416 has an adhesive applied to one of it sides for securing vertical edges 448 of top ply 441 of insert 414 from base ply 420. Adhesive 460 can be either a permanent adhesive or a peelable adhesive. If adhesive 460 is a permanent adhesive, then fastening strip 416 is provided with a line of weakness or perforations 462 for removably securing edge 448 of insert 414 to base ply 420. If a peelable adhesive is used for adhesive 460 of fastening strip 416, then upon removal of insert 414 from base ply 422, fastening strip 416 can be folded along edges 448 of insert 414 to create a smooth, reinforced binding for plies 441–445.

Preferably, fastening strips 416 are shorter in length than the edges 446 of insert 414 so that the three edges of insert 414 can be easily grasped. Of course, in other embodiments (not shown), the fastening strip 416 can be equal to or greater than the length of vertical edges of the insert 414.

Method of Manufacturing Label Assemblies

Figure 13:
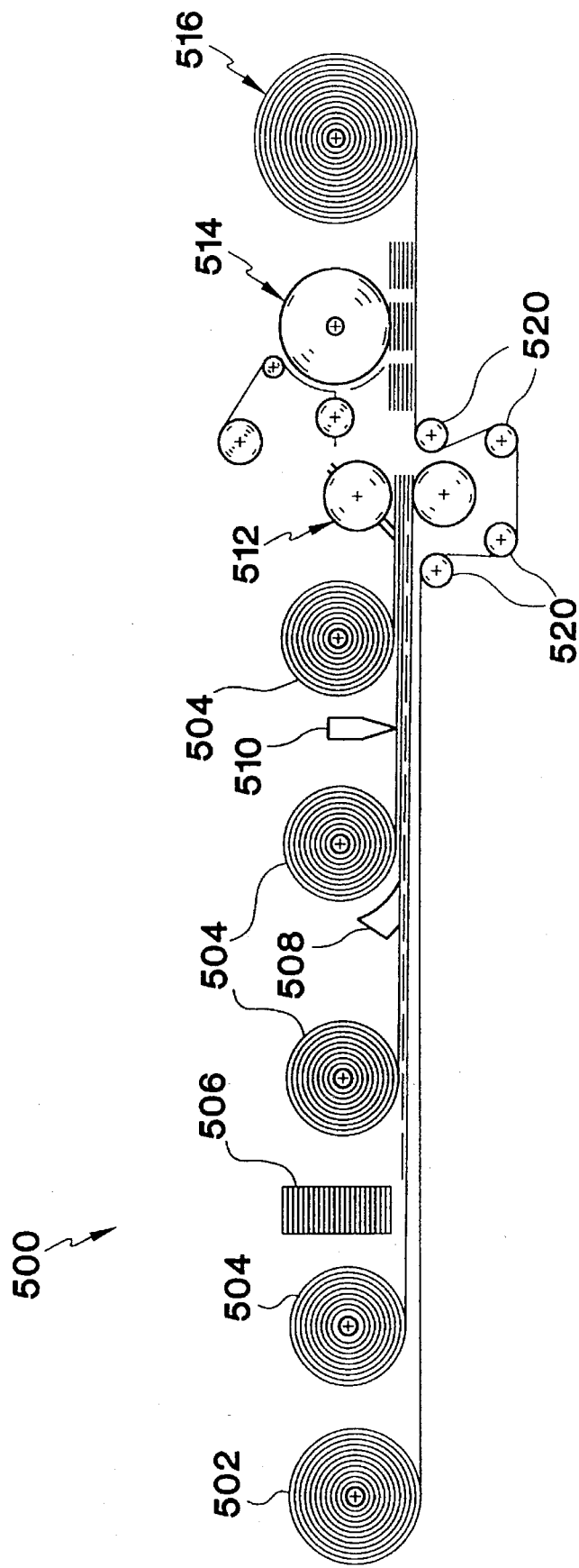
FIG. 13 is a schematic diagram of an apparatus for producing a succession of label assemblies of FIGS. 1–12 in accordance with preferred methods of the present invention.

Referring now to FIG. 13, a schematic diagram of an apparatus 500 is illustrated for producing label assemblies such as label assemblies 10, 210, 310 and 410. Apparatus 500 includes a supply roll 502 of continuous label stock such as label stock 12, 212, 312 or 412, four collator rollers 504 of continuous sheet material, a hopper 506 containing a plurality of insert plies of sheet materials, an optionally plow 508 for plowing the sheet materials of the rolls 504 positioned prior plow 508, an optional gluing station 510 for attaching the sheet material of rolls 504 and hopper 506 together, a die-cut/chip-out 512 to cut the sheet materials of rolls 504 into rectangular insert plies and tip the sheet materials onto the base ply, a label tipping device 514 for applying the fastening strip or strips to secure the insert plies to the base ply of the label stock, and a rewind roll assembly 516 for rolling up the finished label assemblies.

The individual components of apparatus 500 are conventional equipment which is readily available in the mailer collating and manufacturing field, and thus, will not be discussed or illustrated in detail herein. However, the arrangement of this equipment is believed to be unique in that it produces a roll of label assemblies such as label assemblies 10, 210, 310 and 410 discussed above. For example, rollers 502 and 504 are preferably conventional roll feed stands on a conventional Hamilton collator. These rolls are brought together on the bed of the collator using a moving pin band. Hopper 506 can be a hopper feeder inserter such as manufactured by Longford Co. of Canada. The die-cut/chip-out head 512 and rollers 520 can be a conventional die-cut section of a mailer collator such as those sold by Hamilton Tool Company. The label tipping device 514 is preferably, a rotary patcher such as the ones used by Wallace Computer Services, Inc. in their forms manufacturing plants. The rewind roll assembly 516 is a conventional roll rewinder used in the forms manufacturing industry.

Specifically, a continuous web of label stock having a base ply with a pressure-sensitive adhesive thereon and a release liner or ply overlying the adhesive of the base ply is fed from supply roll 502 beneath collator rolls 504 and hopper 506. The sheet materials comprising the multi-ply insert are simultaneously fed from collator rolls 504 and hopper 506 above the label stock. Depending on the desired insert, the sheet materials can be folded by plow 508 and/or glued together by gluing station 510. The sheet material comprising the insert is then brought into a die-cut/chip-out head 512 which cuts the sheet material into rectangular plies or any other desired shape.

The label stock, on the other hand, is fed beneath die-cut/chip-out head 512 by rollers 520, and then brought back up on the other side of die-cut/chip-out head 512. The die-cut/chip-out head 512 then tips the cut plies onto the upper surface of the base ply of the label stock. Next, the fastening strip or strips, such as fastening strips 16, 216, 316 or 416, are applied to each of the inserts and base plies passing beneath label tipping device 514 to securely fasten each of the insets to its respective base ply. Finally, the completed label assemblies are rolled up onto rewind roll assembly 516. Alternatively, the finished product or completed label assemblies can be sheeted or folded off the end of the collator, instead of being rolled up into roll 516.

While several advantageous embodiments have been chosen to illustrate the invention, it will be understood by those skilled in the art that various changes and modifications can be made herein without departing from the scope of the invention as defined in the appended claims.

What is claimed is:

1. A label assembly for attaching to a product, comprising:
a base ply having an informational side and an adhesive side with an adhesive thereon for attaching to the product;
a multi-ply insert overlying a portion of said informational side of said base ply, said insert being smaller than said base ply such that an area of said informational side of said base ply is exposed for viewing indicia received thereon, said insert having a top ply with a peripheral edge; and
a pair of separately spaced fastening strips with an adhesive on one side, said adhesive of said fastening strips engaging said peripheral edge of said top ply and said informational side of said base ply for permanently securing said fastening strips to said informational side of said base ply and to said top ply along its peripheral edge, each of said fastening strips having a line of weakness extending substantially adjacent said peripheral edge of said top ply.

2. A label assembly according to claim 1, wherein
said peripheral edge of top ply of said multi-ply insert includes a first, second, third and fourth edges with said first and second edges being parallel and said third and fourth edges being parallel.

3. A label assembly according to claim 2, wherein
said fastening strips are attached along said first and second edges of said top ply, and said fastening strips are shorter in length than said first and second edges of said top ply.

4. A label assembly according to claim 1, wherein
said top ply is constructed of transparent material.

5. A label assembly according to claim 1, wherein
said line of weakness on each of said fastening strips includes perforations.

6. A label assembly according to claim 1, wherein
said adhesive on said fastening strips is a pressure-sensitive adhesive.

7. A label assembly according to claim 1, wherein
said insert includes a plurality of plies with peripheral edges coupled together along a portion of their peripheral edges.

8. A label assembly according to claim 1, wherein
said base ply has a release liner overlying said adhesive side of said base ply.

9. A label assembly according to claim 8, wherein said release liner is constructed from part of a continuous web material.

10. A label assembly according to claim 1, wherein said insert includes a bottom ply with a peelably adhesive positioned between said base ply and said bottom ply of said insert.

11. A label assembly according to claim 1, wherein said multi-ply insert includes a label ply with an adhesive applied thereto, said label ply being located between said top ply and said base ply.

12. A label assembly according to claim 11, wherein said multi-ply insert further includes a release liner overlying said adhesive on said label ply of said multi-ply insert.

13. A label assembly according to claim 1, wherein said multi-ply insert includes a ply with data applied thereto.

14. A label assembly according to claim 1, wherein said base ply includes variable imaged data applied thereto.

15. A label assembly for attaching to a product, comprising:

a base ply having an informational side and an adhesive side with an adhesive thereon for attaching to the product;

a multi-ply insert overlying a portion of said informational side of said base ply, said insert being smaller than said base ply such that an area of said informational side of said base ply is exposed for viewing indicia received thereon, said insert having a top ply with a rectangular peripheral edge; and a fastening strip having a rectangular peripheral edge and an adhesive on one side extending along at least a portion of said peripheral edge of said fastening strip, said adhesive of said fastening strips engaging said base ply for securing said fastening strip to said informational side of said base ply, said fastening strip overlying said insert such that three sides of said peripheral edge of said fastening strip extend outwardly beyond three sides of said peripheral edge of said insert to engage said base ply along said insert with at least a portion of a fourth side of said peripheral edge of said fastening strip remaining free from engagement with said base ply to allow removal of said insert from said base ply.

16. A label assembly according to claim 15, wherein said adhesive of said fastening strip is a peelable adhesive which allows removal of said fastening strip without tearing said base ply.

17. A label assembly according to claim 15, wherein said adhesive of said fastening strip engages said top ply of said insert.

18. A label assembly according to claim 15, wherein said fastening strip is constructed of a transparent material.

19. A label assembly according to claim 15, wherein said insert includes a plurality of plies with peripheral edges coupled together along a portion thereof.

20. A label assembly according to claim 19, wherein at least some of said plies of said insert are connected together by fold lines.

21. A label assembly according to claim 15, wherein said multi-ply insert includes a label ply with an adhesive applied thereto, said label ply being located between said top ply and said base ply.

22. A label assembly according to claim 15, wherein said multi-ply insert further includes a release liner overlying said adhesive on said label ply of said multi-ply insert.

23. A label assembly according to claim 15, wherein said multi-ply insert includes a ply with data applied thereto.

24. A label assembly according to claim 15, wherein said base ply includes variable imaged data applied thereto.

25. A label assembly for attaching to a product, comprising:

a base ply having an informational side and an adhesive side with an adhesive thereon for attaching to the product;

a multi-ply insert overlying a portion of said informational side of said base ply, said insert having a top ply with exterior and interior surfaces extending between its peripheral edge and an adhesive portion on said interior surface of said top ply along a first portion of said peripheral edge for engaging said base ply to secure said insert to said base ply along said first portion, said insert being smaller than said base ply such that an area of said informational side of said base ply is exposed for viewing indicia received thereon; and a separate fastening strip with an adhesive on one side, said adhesive of said fastening strip being secured to said base ply and to said exterior surface of said top ply along a second portion of said peripheral edge separated and spaced from said first portion.

26. A label assembly according to claim 25, wherein said fastening strip having a line of weakness extending substantially parallel to said first pair of edges.

27. A label assembly according to claim 26, wherein said line of weakness includes perforations.

28. A label assembly according to claim 26, wherein said line of weakness is coextensive with said second portion of said peripheral edge of said insert.

29. A label assembly according to claim 26, wherein said insert includes a plurality of plies with peripheral edges with at least some of said plies between connected together by fold lines along a portion of their peripheral edges.

30. A label assembly according to claim 25, wherein said adhesive on said fastening strip is peelably secured to said base ply for allowing removal of said fastening strip from said base ply without tearing said base ply.

31. A label assembly according to claim 25, wherein said multi-ply insert includes a label ply with an adhesive applied thereto, said label ply being located between said top ply and said base ply.

32. A label assembly according to claim 25, wherein said multi-ply insert further includes a release liner overlying said adhesive on said label ply of said multi-ply insert.

33. A label assembly according to claim 25, wherein said multi-ply insert includes a ply with data applied thereto.

34. A label assembly according to claim 25, wherein said base ply includes data applied thereto.

35. A label assembly for attaching to a product, comprising:

a base ply having an informational side and an adhesive side with an adhesive thereon for attaching to the product;

a multi-ply insert overlying a portion of said informational side of said base ply, said insert being smaller than said base ply such that an area of said informational side of said base ply is exposed for viewing indicia received thereon, said insert having a top ply with a peripheral edge; and at least one fastening strip with an adhesive on one side, said adhesive of said fastening strip engaging said peripheral edge of said top ply and said informational side of said base ply for permanently securing said fastening strip to said informational side of said base ply and to said top ply along its peripheral edge, said fastening strip having a line of weakness extending substantially adjacent said peripheral edge of said top ply so that said multi-ply insert can be completely separated from said base ply.

\* \* \* \* \*